United States Patent Office 3,347,892
Patented Oct. 17, 1967

3,347,892
PROCESS FOR PREPARING DIORGANOBISMUTH HALIDES
John J. Ventura, East Brunswick, N.J., assignor to M&T Chemicals Inc., New York, N.Y., a corporation of Delaware
No Drawing. Filed Dec. 29, 1965, Ser. No. 517,462
8 Claims. (Cl. 260—447)

ABSTRACT OF THE DISCLOSURE

In accordance with certain of its aspects, the novel process of this invention for the preparation of $R_2BiX$, wherein R may be an aromatic hydrocarbon radical and X may be an active halogen selected from the group consisting of chlorine, bromine, and iodine may comprise reacting $R_3Bi$ with $BiX_3$ in the presence of an inert aromatic hydrocarbon diluent thereby forming product $R_2BiX$, and recovering said $R_2BiX$ product.

---

This invention relates to a novel process for preparing chemical compounds. In particular it relates to a novel process for preparing organobismuth compounds particularly characterized by high yield.

Organobismuth compounds, typically diphenylbismuth chloride, may commonly be prepared by various chemical reactions which may be carried out, typically in ether solution, over an extended period of time. Even when such prior art processes have been carried out under most efficient known conditions, the reaction has been unsatisfactory in that it requires extremely large volumes of solvent, usually ether; and furthermore it requires an extended reaction time—typically at least about five hours. Furthermore, prior art processes are characterized by production of low yields of a product which is generally of low purity. Typical products prepared by prior art processes are attained in yield of less than about 80%.

It is an object of this invention to provide a novel process for preparing organobismuth compounds in high yield and purity in a short time. Other objects will be apparent to those skilled in the art from inspection of the following description.

In accordance with certain of its aspects, the novel process of this invention for the preparation of $R_2BiX$, wherein R may be an aromatic hydrocarbon radical and X may be an active halogen selected from the group consisting of chlorine, bromine, and iodine may comprise reacting $R_3Bi$ with $BiX_3$ in the presence of an inert aromatic hydrocarbon diluent thereby forming product $R_2BiX$, and recovering said $R_2BiX$ product.

The $R_3Bi$ compounds which may be used in the practice of this invention may be compounds wherein each of the R groups is an aromatic hydrocarbon radical. Typically such radicals may include phenyl, tolyl, xylyl, mesityl, etc. The R radicals may bear inert substituents which are inert under the reaction conditions set forth infra. Typically such inert groups may be lower alkyl compounds such as methyl, ethyl, etc. Preferably all of the R groups may be the same; and the most preferred group is phenyl. The preferred compound $R_3Bi$ may be triphenylbismuth.

The $BiX_3$ compound which may be reacted in accordance with the process of this invention may be a compound wherein X may be an active halogen typically selected from the group consisting of chlorine, bromine, and iodine. Preferably all of the X atoms may be the same, preferably chloride. Preferred compound $BiX_3$ may thus be bismuth trichloride.

The process of this invention in accordance with certain of its aspects may be carried out by reacting $R_3Bi$ with $BiX_3$ in accordance with the following reaction:

$$2R_3Bi + BiX_3 \rightarrow 3R_2BiX \qquad (I)$$

The reaction may preferably be carried out in the presence of an inert aromatic hydrocarbon diluent having a boiling point of 110° C.–180° C. Typically the diluent may be toluene (B.P. 110.6° C.); o-xylene (B.P. 138.4° C.); m-xylene (B.P. 139.1° C.); p-xylene (B.P. 138.4° C.); ethylbenzene (B.P. 144.4° C.); mesitylene, i.e. 1,3,5-trimethylbenzene (B.P. 164.7° C.); etc. The preferred commercial diluent may be xylene; and it may be employed as a commercial mixture of the isomers having a boiling point of about 139° C.–140° C. Mesitylene may permit attainment of extremely high yields of high purity product.

In practice of the invention, the diluent may be present in the reaction mixture in amount equivalent to 1.0 to 3.0, say 1.3 moles per mole of the product to be prepared. Typically this may be equivalent to about 0.4 to 1.0, say 0.5 part by weight of diluent per part of weight of $R_3Bi$ charge material in the preferred embodiment. The diluent may be added to the reaction mixture to which may thereafter be added the $R_3Bi$ and the $BiX_3$. Preferably reaction may be carried out in the presence of an inert gas, typically nitrogen. The reaction may be at a temperature of 110° C.–180° C., typically about 140° C. and most preferably at the reflux temperature of the diluent.

The reaction may be carried out for 15–60 minutes, preferably 30 minutes, during which time solid $R_2BiX$ may be observed to form in the heterogeneous reaction mixture. After 15 to 60 minutes, typically 30 minutes, the reaction may be essentially complete and the reaction mixture may be cooled to 25° C.–20° C.

The solid product may be separated from the reaction mixture as by filtration and dried, preferably in vacuo. The product $R_2BiX$ may typically be attained in yields of at least about 95%, typically 95% to 98% and frequently approaching stoichiometric 100%. The product may be normally obtained in essentially pure form, free of charge materials including $R_3Bi$ and $BiX_3$ and may normally be found to possess a melting point within the accepted range. Typically it may, for example, be readily possible to prepare diphenylbismuth chloride having a melting point of 183° C.–187° C. in yields approaching stoichiometric in a time which may be 30 minutes. In contrast, prior art procedures may require times of at least 5 hours to give yields of 80% or less. Other products, e.g. ditolylbismuth chloride, may be similarly made.

Practice of the novel process of this invention may be more readily apparent from inspection of the following illustrative examples wherein the parts are parts by weight unless otherwise set forth.

EXAMPLE I.—$2(C_6H_5)_3Bi + BiCl_3 \rightarrow 3(C_6H_5)_2BiCl$

In practice of the process of this invention in accordance with a preferred embodiment, 98.82 parts (0.2 mole+2% excess) of triphenylbismuth and 31.54 parts (0.1 mole) of bismuth trichloride and 43.5 parts of commercial xylene may be charged to the reaction vessel which may be fitted with an agitator and a nitrogen blanket. The reaction mixture may be heated rapidly with agitation to reflux temperature of 140° C. at which temperature the reaction mixture may be maintained for 30 minutes. During this time, the apparent viscosity of the reaction mixture may increase as the product diphenyl bismuth chloride is formed. The reaction mixture may then be cooled to room temperature.

The thick slurry obtained may be filtered under vacuum to permit recovery of a pale yellow solid which after drying in vacuo may be 119 parts, equivalent to a 97% yield of diphenylbismuth chloride. Upon analysis this product may be found to contain 52.75% bismuth (calc. 52.42%) and 9.01% chlorine (calc. 8.89%). The product may also be found to have a melting point of 184° C–185° C. (reported melting point 183° C.–187° C.).

EXAMPLE II

In practice of the process of this invention in accordance with another embodiment, 92.46 parts (0.2 mole +5% excess) of triphenylbismuth and 31.54 parts (0.1 mole) of bismuth trichloride and 43.0 parts of commercial toluene may be charge to the reaction vessel which may be fitted with an agitator and a nitrogen blanket. The reaction mixture may be heated rapidly with agitation to reflux temperature of about 111° C. at which temperature the reaction mixture may be maintained for 30 minutes. During this time, the apparent viscosity of the reaction mixture may increase as the product diphenyl bismuth chloride is formed. The reaction mixture may then be cooled to room temperature.

The thick slurry obtained may be filtered under vacuum to permit recovery of a pale yellow solid which after drying in vacuo may be 108.5 parts equivalent to a 88.3% yield of diphenyl bismuth chloride.

EXAMPLE III

In practice of the process of this invention in accordance with another embodiment, 89.82 parts (0.2 mole) of triphenyl bismuth and 31.54 parts (0.1 mole) of bismuth trichloride and 43.0 parts of commercial mesitylene may be charged to the reaction vessel which may be fitted with an agitator and a nitrogen blanket. The reaction mixture may be heated rapidly with agitation to reflux temperature of about 170° C. at which temperature the reaction mixture may be maintained for 15 minutes. During this time, the apparent viscosity of the reaction mixture may increase as the product diphenyl bismuth chloride is formed. The reaction mixture may then be cooled to room temperature.

The thick slurry obtained may be filtered under vacuum to permit recovery of a pale yellow solid which after drying in vacuo may be 118.6 parts equivalent to a 99% yield of diphenyl bismuth chloride (M.P. 185°–187° C.). The product may be found to contain 52.43% Bi (calc. 52.42%) and 8.67% Cl (calc. 8.89%).

Although this invention has been disclosed by reference to various specific examples, it will be apparent to those skilled in the art that various modifications and changes may be made thereto which fall within the scope of this invention.

I claim:
1. The process for preparing $R_2BiX$, wherein R is an aromatic hydrocarbon radical and X is an active halogen selected from the group consisting of chlorine, bromine, and iodine which comprises reacting $R_3Bi$ with $BiX_3$ in the presence of an inert aromatic hydrocarbon diluent thereby forming product $R_2BiX$, and recovering said $R_2BiX$ product.
2. The process for preparing $R_2BiX$ as claimed in claim 1 wherein R is phenyl.
3. The process for preparing $R_2BiX$ as claimed in claim 1 wherein X is chlorine.
4. The process for preparing $R_2BiX$ as claimed in claim 1 wherein $R_2BiX$ is diphenyl bismuth chloride.
5. The process for preparing $R_2BiX$ as claimed in claim 1 wherein said inert aromatic hydrocarbon has a boiling point of 110° C.–180° C.
6. The process for preparing $R_2BiX$ as claimed in claim 1 wherein said inert aromatic hydrocarbon is selected from the group consisting of toluene and xylene.
7. The process for preparing $R_2BiX$ as claimed in claim 1 wherein said inert aromatic hydrocarbon is present in amount of 0.4–1.0 part by weight per part of $R_3Bi$.
8. The process for preparing diphenyl bismuth chloride which comprises reacting triphenyl bismuth with bismuth trichloride in the presence of an inert hydrocarbon diluent thereby forming product diphenyl bismuth chloride, and recovering said diphenyl bismuth chloride product.

References Cited

Gilman et al.: J.A.C.S., vol. 63 (1941), pp. 207 to 211.

TOBIAS E. LEVOW, *Primary Examiner.*

W. F. W. BELLAMY, *Assistant Examiner.*